United States Patent
Okayasu

(10) Patent No.: US 7,686,465 B2
(45) Date of Patent: Mar. 30, 2010

(54) KEY INPUT DEVICE

(75) Inventor: Akihito Okayasu, Kanagawa (JP)

(73) Assignee: NEC Corporation (JP)

( * ) Notice: Subject to any disclaimer, the term of this patent is extended or adjusted under 35 U.S.C. 154(b) by 585 days.

(21) Appl. No.: 11/679,719

(22) Filed: Feb. 27, 2007

(65) Prior Publication Data

US 2007/0139384 A1  Jun. 21, 2007

Related U.S. Application Data

(62) Division of application No. 10/631,798, filed on Jul. 31, 2003, now abandoned.

(30) Foreign Application Priority Data

Aug. 1, 2002  (JP) ............................ 2002-225197

(51) Int. Cl.
*G01D 11/28* (2006.01)
*H04M 1/22* (2006.01)
*G09G 3/36* (2006.01)

(52) U.S. Cl. .............................. 362/23; 362/24; 362/85

(58) Field of Classification Search .................. 362/24, 362/30, 85, 23, 800; 345/170, 169; 379/456
See application file for complete search history.

(56) References Cited

U.S. PATENT DOCUMENTS

| 5,408,060 | A  | * | 4/1995 | Muurinen | ................... 200/314 |
| 6,762,740 | B1 | * | 7/2004 | Kimura | ...................... 345/102 |
| 6,765,556 | B2 | * | 7/2004 | Kandogan et al. | ........... 345/168 |
| 2004/0022047 | A1 | * | 2/2004 | Okayasu | ...................... 362/23 |

\* cited by examiner

*Primary Examiner*—Jacob Y Choi
(74) *Attorney, Agent, or Firm*—Ostrolenk Faber LLP

(57) ABSTRACT

A key input device includes a key input section, mode switching section, key backlight, and key backlight lighting control section. The key input section inputs characters by key input in a plurality of character input modes. The mode switching section switches a plurality of character input modes. The key backlight is placed on a lower surface of the key input section and is lighted in a plurality of colors. The key backlight lighting control section changes the lighting color of the key backlight in accordance with switching of character input modes. A cell phone is disclosed.

1 Claim, 7 Drawing Sheets

KEY INPUT DEVICE

CROSS REFERENCE TO RELATED APPLICATIONS

This is a divisional of U.S. patent application Ser. No. 10/631,798, filed Jul. 31, 2003 in the name of NEC Corporation and entitled KEY INPUT DEVICE.

BACKGROUND OF THE INVENTION

The present invention relates to a key backlight for a cell phone or the like having an operation key section and, more particularly, to a key input device including a light-emitting means for lighting or blinking an operation key section in different modes or colors in accordance with key operation.

In a cell phone having an operation key section constituted by a plurality of keys for operating the cell phone, e.g., inputting a telephone number or mail using characters, the keys of the operation key section are formed from a transparent or translucent material. In addition, a plurality of light-emitting portions (key backlights) are arranged on the bottom sides of these keys to light or blink the operation key section in different modes or colors in accordance with the operation of the cell phone.

Japanese Patent Laid-Open No. 2001-217904 discloses a technique of using an operation key section as a notification means and display means by utilizing the above operation.

FIG. 7 shows the outer appearance of a cell phone with an operation key section lighting function disclosed in the above reference. An operation key section 54 formed from a translucent member is comprised of a plurality of keys such as dial number keys 54a, a signal transmission/reception key, an on-hook key 54b, a mail key 54c, and various setting keys. The operation key section 54 also serves as an input operation means for a control section in the cell phone body.

Multicolor light-emitting portions (key backlights) 55 are arranged in correspondence with the respective keys. Each light-emitting portion is constituted by a multicolor LED or the like capable of emitting two or more different color beams. The emission mode of each multicolor light-emitting portion 55 is controlled by the control section in the cell phone body. In addition, the multicolor light-emitting portions 55 emit light beams in predetermined colors in accordance with various kinds of operation of the cell phone.

For example, musical notes are assigned in advance to the multicolor light-emitting portions 55 and the corresponding keys, and the multicolor light-emitting portions 55 are made to emit light beams in different colors in accordance with the musical notes of melody sounds generated by the melody sound generating section in the cell phone body. Alternatively, when a plurality of melodies are set, the multicolor light-emitting portions are made to emit light beams in different colors in accordance with the kinds of melodies. This makes it possible to discriminate, in accordance with an emission color, who has made a call.

In addition, when mail is received, the multicolor light-emitting portion 55 corresponding to a numeric key indicating the number of incoming calls is made to emit light in accordance with the number of received mail.

When the dial number key 54a lighted by the light emitted by the multicolor light-emitting portion 55 is pressed, the contents of the mail are displayed on a display section 53.

Many functions as added values, e.g., a mail function and browser function, are added to recent cell phones.

For example, in performing mail transmission using the mail function, the user must input a mail message using keys of the operation key section of the cell phone.

The operation key section, however, has ten-odd keys at most. The user must input characters in various modes, e.g., the numeric input mode, kanji input mode, and alphabet input mode using such limited number of keys. In general, therefore, the character input modes are switched by a character input mode changing key to allow the user to input various kinds of characters by key input in a desired character input mode while checking an icon indicating a character input mode, which is displayed on a corner of the display screen.

As described above, the user must set a desired input mode while checking the currently used input mode with a small icon displayed on a corner of the display screen.

If the character input mode is changed by an input error unintended by the user, he/she tends to overlook the change in mode with such a small icon. As a consequence, the input error makes the user waste extra time creating a mail message.

SUMMARY OF THE INVENTION

It is an object of the present invention to facilitate confirmation of the currently used character input mode and allow a user to know a newly set character input mode upon occurrence of a change in character input mode, thereby improving the efficiency of character input operation through an operation key section.

In order to achieve the above object, according to the present invention, there is provided a key input device comprising key input means for inputting characters by key input in a plurality of character input modes, switching means for switching a plurality of character input modes, a key backlight which is placed on a lower surface of the key input means and is lighted in a plurality of colors, and lighting control means for changing a lighting color of the key backlight in accordance with switching of character input modes.

DESCRIPTION OF THE PREFERRED EMBODIMENTS

Figure 1:
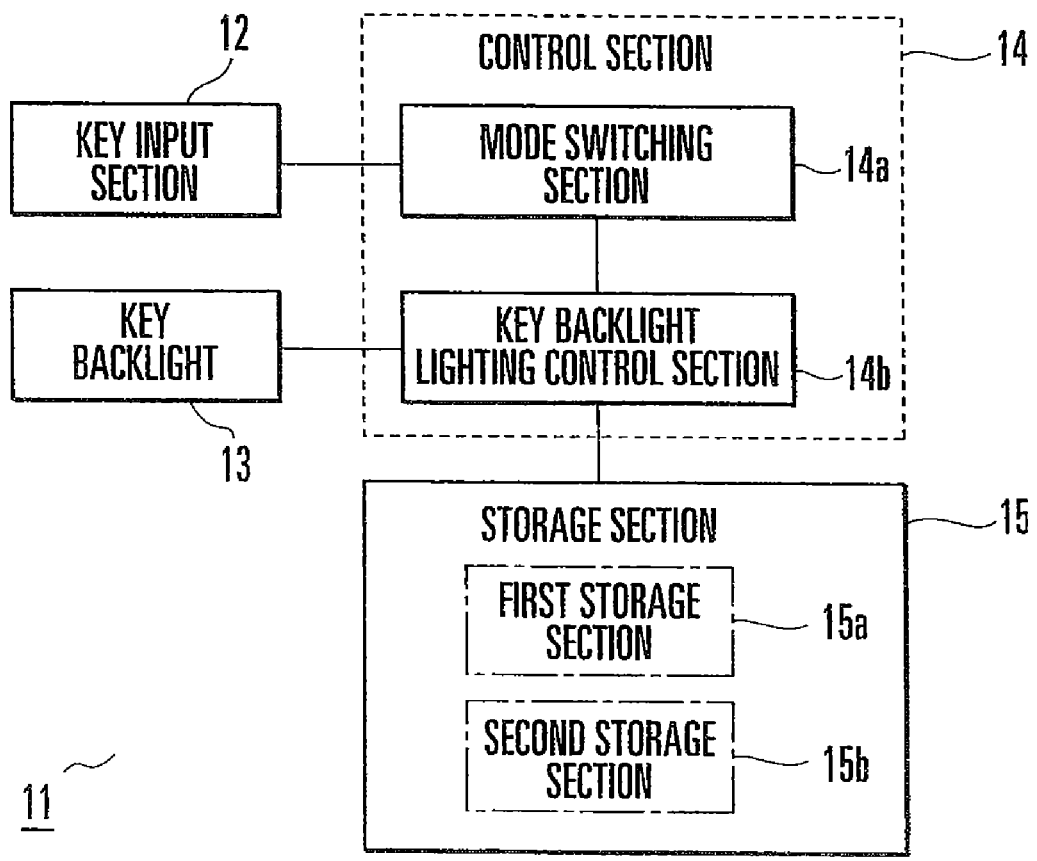
FIG. 1 is a block diagram showing a key input device according to an embodiment of the present invention.

As shown in FIG. 1, a key input device 11 according to the present invention includes a key input section 12 for inputting character strings and the like and a key backlight 13 which is placed on the lower surface of the key input section and lighted in various different colors. In this case, the key input section 12 includes a plurality of keys 154a, 154b, and 154c (to be described later). The key backlight 13 has light-emitting means 155a (to be described later) located on the lower surfaces of the respective keys 154a, 154b, and 154c.

The key input device 11 also includes a control section 14 having a mode switching section 14a which is connected to the key input section 12 to switch the character input modes of the key input section 12, and a key backlight lighting control section 14b which changes the lighting color of the key backlight 13 in synchronism with switching of the set character input modes. The key input device 11 is connected to the key backlight lighting control section 14b and includes a storage section 15 having a first storage section 15a and second storage section 15b.

In the key input device 11, the first storage section 15a cannot be overwritten, and the second storage section 15b can be overwritten.

Figure 2:
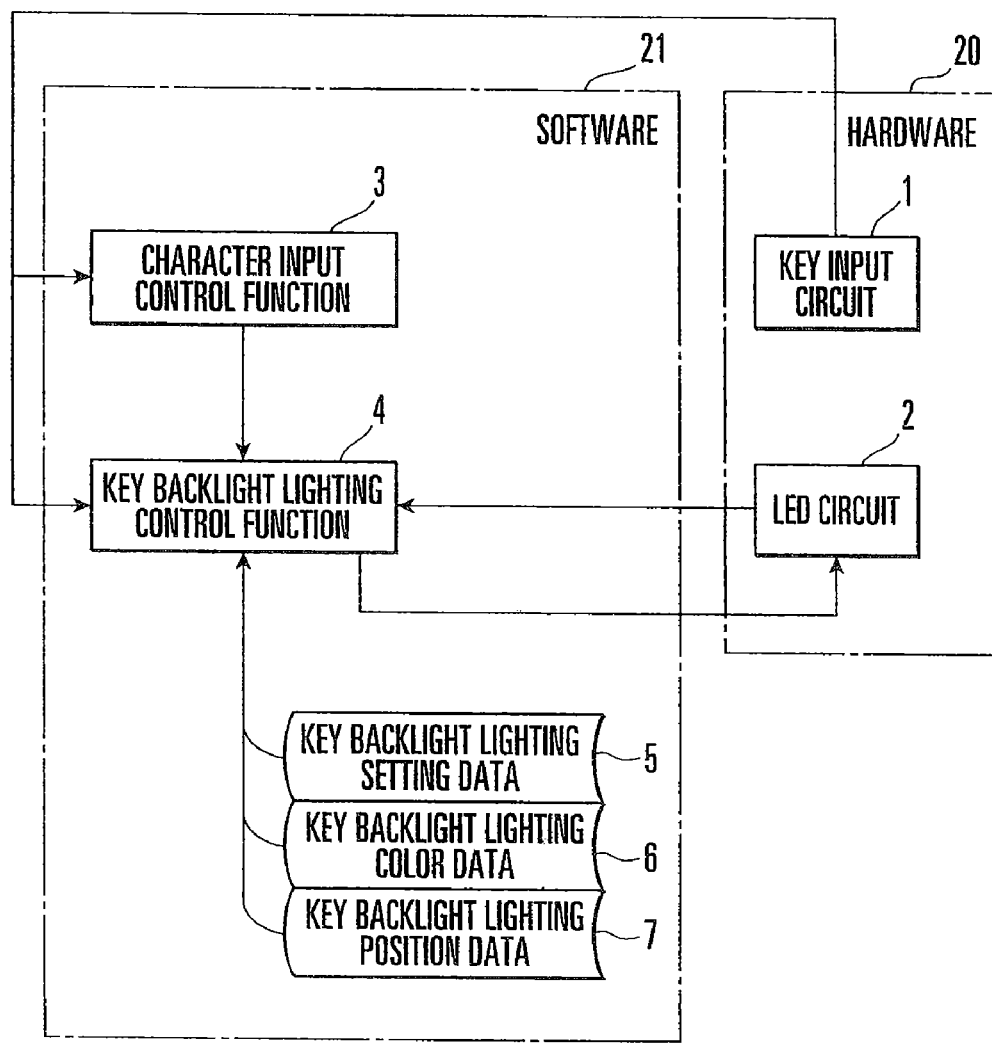
FIG. 2 is a block diagram showing the hardware arrangement and software arrangement of the key input device according to the first embodiment of the present invention.

As shown in FIG. 2, the hardware arrangement of the key input device 11 according to the present invention is constituted by a key input circuit 1 which receives input signals upon character input operation by a user, and an LED circuit 2 which lights or blinks the key backlight. The software arrangement of the key input device 11 according to the present invention includes a character input control function 3 for controlling character input modes such as a kanji input mode, and a key backlight lighting control function 4 for controlling the lighting color and light position of the key backlight.

The data handled by the key backlight lighting control function is constituted by key backlight lighting setting data 5 for holding a setting indicating whether the key backlight is to be lighted or unlighted, key backlight lighting color data 6 for holding combinations of character input modes and lighting colors, and key backlight lighting position data 7 for holding the positions of keys that can be used for character input operation in the respective character input modes.

Software programs 21 described above are stored in the first storage section 15a in advance. Hardware 20 operates under the control of the software programs 21 to implement the function of each section described above.

Figure 3:
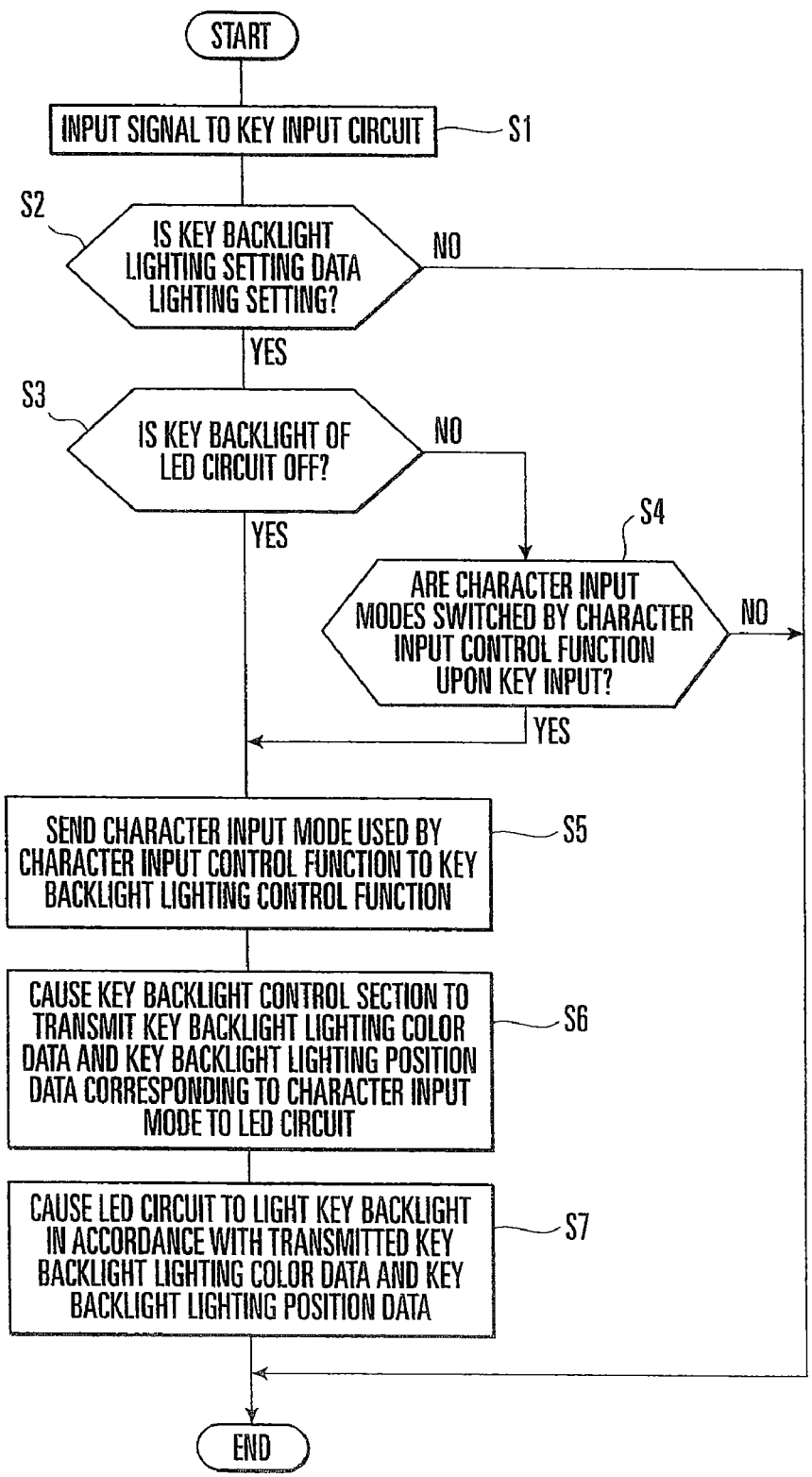
FIG. 3 is a flow chart showing the operation of the first embodiment.

FIG. 3 shows the operation of this embodiment. The operation of the present invention will be described below with reference to FIGS. 2 and 3.

When a signal is input to the key input circuit 1 upon key operation (step S1), the key backlight lighting control function 4 refers to the key backlight lighting setting data 5 to check whether or not a setting for lighting the key backlight has been made for this key input signal (step S2).

If the determination result indicates an "unlighting setting" (step S2: NO), the processing is terminated without lighting the key backlight. If the determination result indicates a "lighting setting" (step S2: YES), it is checked whether or not the key backlight of the LED circuit 2 is currently OFF (step S3).

If the key backlight of the LED circuit 2 is currently OFF (step S3: YES), the character input control function 3 transfers a character input mode signal to the key backlight lighting control function 4 to prepare for lighting of the key backlight (step S5).

If the key backlight of the LED circuit 2 is currently ON (step S3: NO), the character input control function 3 checks whether character input modes have been switched (step S4).

If no character input modes have been switched (step S4: NO), the state of the key backlight is kept unchanged, and the processing is terminated.

If character input modes have been switched (step S4: YES), the character input control function 3 transfers a character input mode signal to the key backlight lighting control function 4 to prepare for changing of the color and lighting position of the key backlight (step S5).

Upon reception of the character input mode signal from the character input control function 3 in step S5, the key backlight lighting control function 4 refers to the key backlight lighting color data 6 and key backlight lighting position data 7 and transmits key backlight lighting color data and key backlight lighting position data corresponding to the received character input mode to the LED circuit 2 (step S6).

In accordance with the received backlight lighting color data and key backlight lighting position data, the LED circuit 2 lights, in designated lighting color, the backlights for keys that can be used for input operation (step S7).

The above embodiment has exemplified the character input modes such as the kanji input mode. In addition to them, however, a numeric input mode and the like can be set, and the device can be switched to these modes as needed. In addition, the device may be switched to an input mode based on the language spoken in the country where the device is used. For example, the device may be switched to an English input mode in an English-speaking country; a French input mode in a French-speaking country; and a German input mode in a German-speaking country. In addition, the key backlight can be lighted in many colors such as red and blue.

A specific arrangement for multicolor lighting of the key backlight can be implemented by a proper means, e.g., the multicolor light-emitting portions in the above reference. For example, red, green, and blue LEDs (light-emitting portions) are arranged as light-emitting portions. A transparent or translucent member is preferably used for each key of the key input, which is used for character input operation and the like. In this embodiment, in synchronism with a character input mode, the entire key input section or only corresponding keys that can be used for input operation are lighted by key backlights in a corresponding color. This allows the user to visually recognize, through the key backlights, the current character input mode and whether or not character input operation can be done.

In this case, the lighting color of each key backlight makes the user visually recognize the currently used character input mode and whether or not character input operation can be done. When the character input mode is changed, the lighting colors or lighting positions of key backlights are changed. If, therefore, an unintentional change in character input mode occurs, the user can recognize the change before performing key input operation. This leads to a reduction in input errors.

Figure 4:
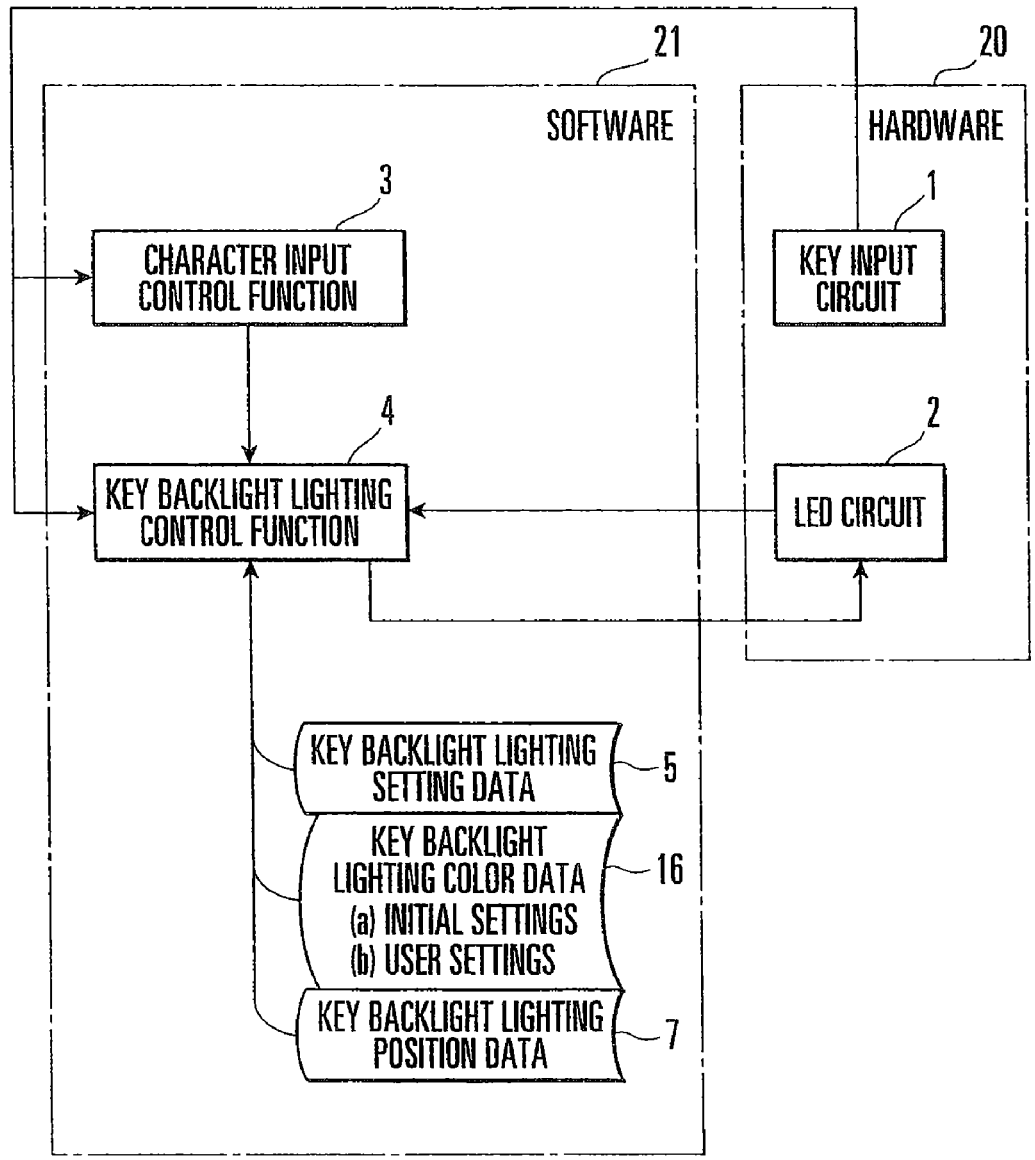
FIG. 4 is a block diagram showing the second embodiment of the present invention.

The second embodiment of the present invention will be described next with reference to FIG. 4.

The second embodiment differs from the first embodiment in key backlight lighting color data 6. A characteristic feature of this embodiment is that a user can change the combinations of character input modes and corresponding key backlight lighting colors.

The data of a combination designated by the user is stored in a storage area for user settings (b) different from a storage area for initial settings (a). For example, the initial settings (a) are stored in a first storage section 15a, and the user settings (b) are stored in a second storage section 15b.

The basic operation of a key backlight lighting control function 4 is the same as that in the first embodiment. When, however, the user settings (b) are stored, the storage area for the user settings (b) is preferentially referred to, and an LED circuit 2 is lighted in accordance with the combinations of character input modes and corresponding key backlight lighting colors which are designated by the user.

According to this embodiment, the combinations of character input modes and corresponding key backlight lighting colors can be changed in accordance with the preferences of the user, as needed. In addition, since different storage areas are provided for the initial settings (a) and user settings (b), the initial settings are not overwritten and changed, and the user can return to the initial settings (a) as needed.

Figure 5:
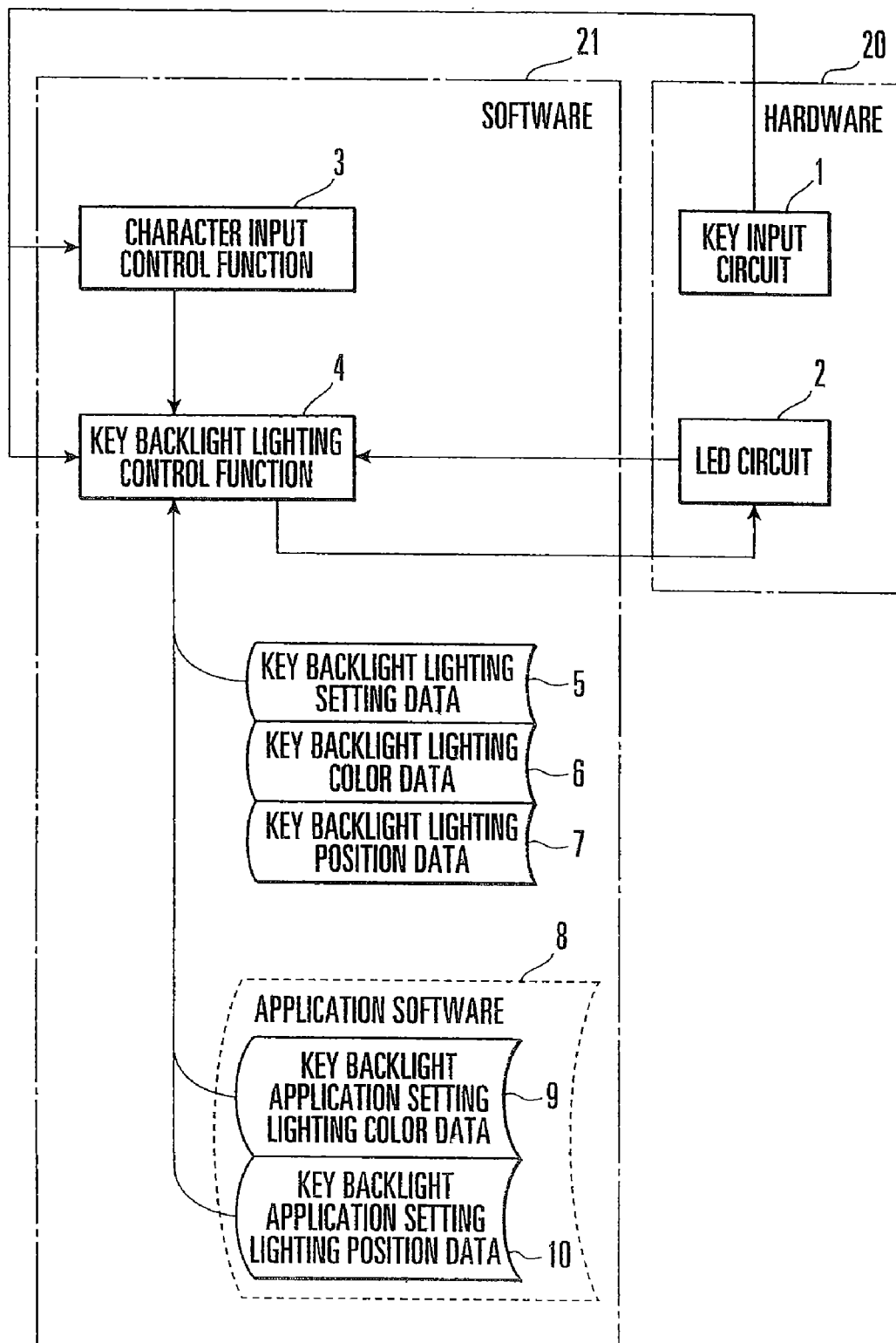
FIG. 5 is a block diagram showing the third embodiment of the present invention.

The third embodiment of the present invention will be described next with reference to FIG. 5.

The third embodiment differs from the first embodiment in that it has application software 8. In this embodiment, the programs created by JAVA (registered trademark) or the like are downloaded into a software section. If the downloaded application software 8 includes key backlight application setting lighting color data 9 and key backlight application setting lighting position data 10, a key backlight lighting control function 4 refers to these data.

In this case, the key backlight application setting lighting color data 9 is data which defines combinations of character input modes and lighting colors, and the key backlight application setting lighting position data 10 is data which defines the positions of keys prepared for the respective character input modes, which can be used for character input operation. This application is stored in a second storage section 15*b*.

The key backlight lighting control function 4 refers to the key backlight application setting lighting color data 9 and key backlight application setting lighting position data 10 while the application software 8 is executed.

This operation makes it possible to perform LED control by operation similar to character input operation. As a consequence, scene changes and keys that can be used for input operation can be displayed with key backlights so as to be visually discriminated.

Figure 6:
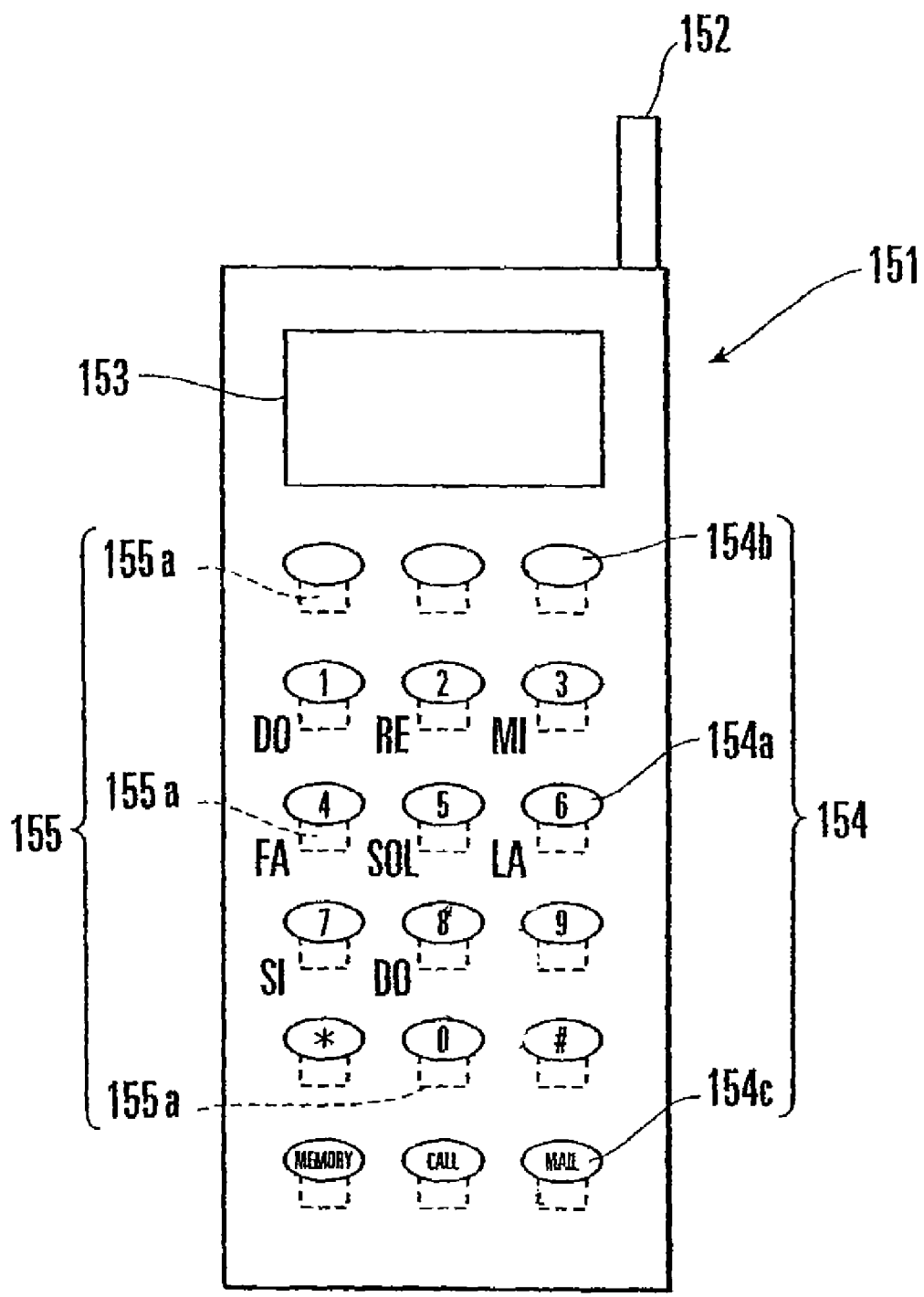
FIG. 6 is a view showing the outer appearance of a cell phone incorporating the present invention.
Figure 7:
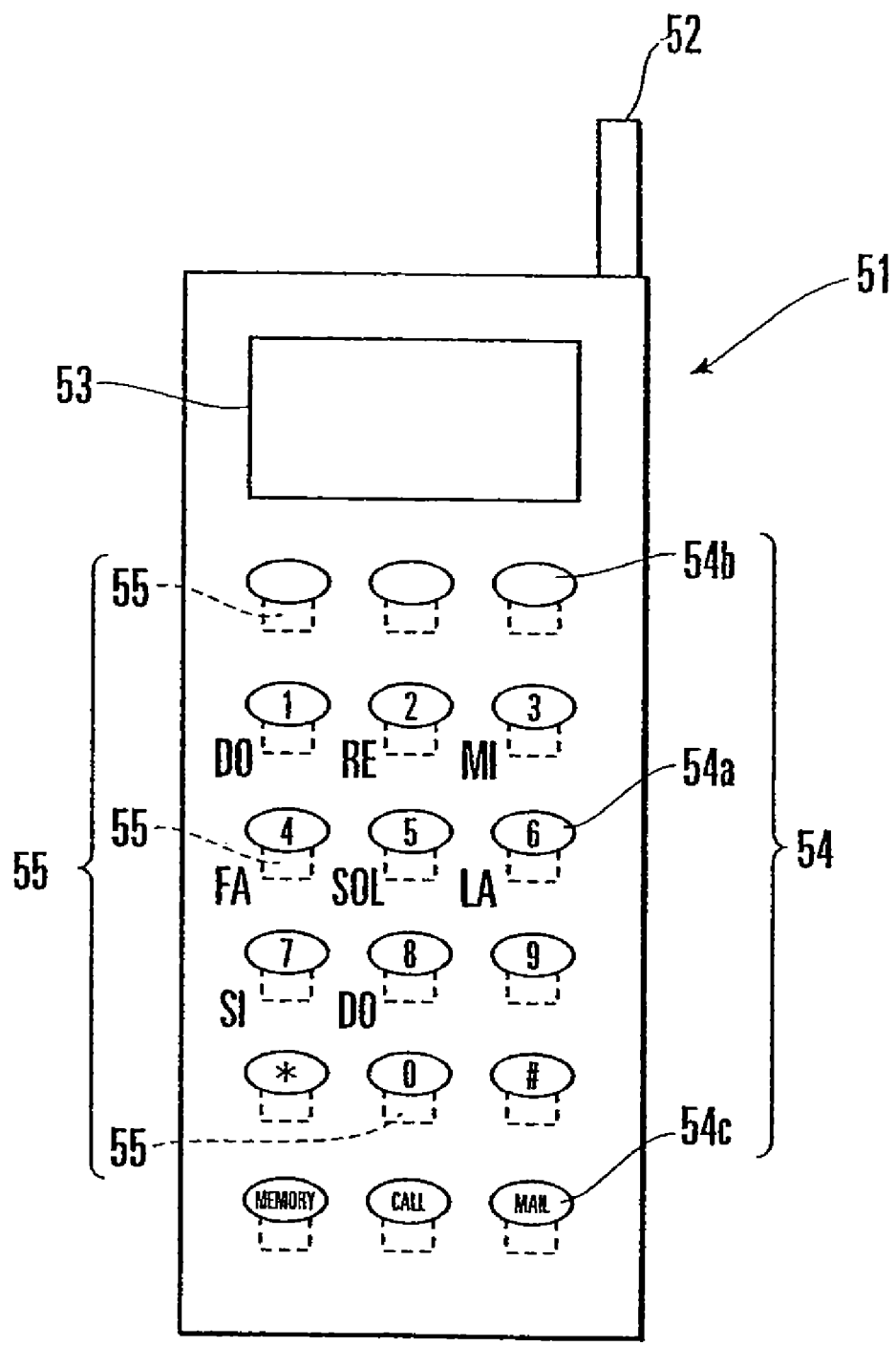
FIG. 7 is a view showing the outer appearance of a conventional cell phone to which the present invention can be applied.

FIG. 6 shows cell phone incorporating the key input device according to the above embodiment. A cell phone 151 includes an antenna 152 and operation key section 154, like the cell phone 51 described with reference to FIG. 7. An operation key section 154 includes a plurality of keys such as dial number keys 154*a*, a signal transmission/reception key, an on-hook key 154*b*, a mail key 154*c*, and various setting keys.

The operation key section 154 also includes a multicolor light-emitting section (key backlight) 155 which is placed on the lower surface of the operation key section 154 and lighted in a plurality of colors. The multicolor light-emitting section 155 includes a plurality of light-emitting portions 155*a* provided for the respective keys. In synchronism with a character input mode, the light-emitting portions 155*a* light all the operation keys or only corresponding keys that can be used for input operation in a corresponding color.

The above embodiment has been described on the premise that the present invention is applied to the operation key section of the cell phone. However, the present invention can also be applied to other mobile terminals, personal computers, and the like which have a key input section designed to perform key input operation while switching a plurality of character input modes.

According to the present invention, the lighting color of the key backlight allows the user to visually recognize the current character input mode, whereas the lighting position of the key backlight allows the use to visually recognize each key that can be used for key input operation. This makes it possible to efficiently perform character input operation.

In addition, the user can visually recognize switching of character input modes in accordance with the lighting color of the backlight and a change in light position. This can therefore prevent the user from making an input error without noticing a change in the icon on the screen.

The features of the invention are as set forth in the paragraphs below:

1. A key input device characterized by comprising:
   key input means (12) for inputting characters by key input in a plurality of character input modes;
   switching means (14*a*) for switching a plurality of character input modes;
   a key backlight (13) which is placed on a lower surface of said key input means (12) and is lighted in a plurality of colors; and
   lighting control means (14*b*) for changing a lighting color of said key backlight (13) in accordance with switching of character input modes.

2. A device according to paragraph 1, wherein
   said key input means (12) comprises a plurality of keys (154*a*, 154*b*, 154*c*),
   said key backlight (13) comprises light emitting means (155*a*) located at lower surfaces of the respective keys (154*a*, 154*b*, 154*c*), and
   said lighting control means (14*b*) changes a lighting color of only the light emitting means (155*a*) located at the lower surface of a key which can be used for character input operation in a set character input mode.

3. A device according to paragraph 1, wherein
   said device further comprises storage means (15) for storing correspondence data between a plurality of character input modes and a plurality of colors, and
   when a signal indicating that a character input mode is switched is input from said key input means (12), said key backlight lighting control means (14*b*) determines a lighting color of said key backlight (13) by referring to said storage means (15).

4. A device according to paragraph 3, wherein
   said storage means (15) comprises first storage means (15*a*) which cannot be overwritten, and
   the correspondence data is stored as an initial setting value in the first storage means (15*a*).

5. A device according to paragraph 4, wherein
   said storage means (15) comprises second storage means (15*b*) which can be overwritten, and
   said key backlight lighting control means (14*b*) writes the correspondence data as a user setting value in the second storage means (15*b*).

6. A device according to paragraph 5, wherein said key backlight lighting control means (14*b*) preferentially refers to a user setting value when the user setting value is stored.

7. A device according to paragraph 3, wherein
   said storage means (15) further comprises key backlight application setting lighting color data for setting a lighting color of said key backlight, and key backlight application setting lighting position data for setting a lighting position of said key backlight, and
   said key backlight lighting control means (14*b*) determines a lighting color of said key backlight (13) by referring to at least one of key backlight application setting lighting color data and key backlight application setting lighting position data.

8. A device according to paragraph 7, wherein said key backlight lighting control means (14*b*) downloads key backlight application setting lighting color data and key backlight application setting lighting position data.

9. A cell phone characterized by comprising a key input device defined in paragraph 1.

The invention claimed is:

1. A key input device comprising:

key input means for inputting characters by key input in a plurality of character input modes;

switching means for switching a plurality of character input modes;

a key backlight which is placed on a lower surface of said key input means and is lighted in a plurality of colors; and key backlight lighting control means for changing a lighting color and a lighting position of said key backlight so that backlights are lighted for each set of keys that are usable for each character input mode of the plurality of character input modes in accordance with switching of character input modes, said key input means comprising a plurality of keys, said key backlight comprising light-emitting means located at a lower surface of the respective keys and located below the bottom of a top surface of the respective keys when the respective keys are viewed in a direction perpendicular to the top surface of the respective keys; wherein said device further comprises storage means for storing correspondence data between a plurality of character input modes and a plurality of colors, and when a signal indicating that a character input mode is switched is input from said key input means, said key backlight lighting control means determines a lighting color of said key backlight by referring to said storage means;

wherein said storage means further comprises key backlight application setting lighting color data for setting a lighting color of said key backlight, and key backlight application setting lighting position data for setting a lighting position of said key backlight, and said key backlight lighting control means determines a lighting color of said key backlight by referring to at least one of key backlight application setting lighting color data and key backlight application setting lighting position data;

and further wherein said key backlight lighting control means is configured to obtain, from a source external to said key input device, application software including key backlight information setting lighting color data and key backlight information setting lighting position data, and is further configured to refer to at least one of the key backlight information setting lighting color data and the key backlight information setting lighting position data while the application software is being executed.

* * * * *